Feb. 25, 1958     G. H. HARRIS     2,824,984
ELECTRIC MOTOR HOUSING

Filed May 15, 1956     2 Sheets-Sheet 1

Garrett H. Harris
INVENTOR.

Garrett H. Harris
INVENTOR.

United States Patent Office 2,824,984
Patented Feb. 25, 1958

2,824,984

ELECTRIC MOTOR HOUSING

Garrett H. Harris, Jackson, Miss.

Application May 15, 1956, Serial No. 584,949

2 Claims. (Cl. 310—87)

This invention relates to electric motors which are adapted to be used underwater to propel boats or for other purposes where a leak-proof housing is desirable or required.

It is difficult to provide an enclosure for motors used under water. My experience is that many supposedly leak-proof enclosures leak. Additionally, such motors are very inaccessible for servicing, often requiring the entire assembly to be returned to the factory that produced it, where special tools and skills are necessary in order to service or repair the motor unit. The inconvenience in such a procedure is manifest.

An object of the present invention is to provide a simple means of constructing a housing in which there is an electric motor unit, the housing being leak-proof as far as liquids are concerned, and at the same time providing for simple servicing whereby the motor unit may be easily and quickly removed and replaced for service or exchange, without requiring the use of any special tools or skills.

A more specific object of the invention is to provide a motor of the type which is adapted for primary use under water, as in propelling boats, the motor having a housing that is made of two sections, one section accommodating the motor unit in which it is bolted and the other section also containing a part of the motor unit and bolted by means of a single bolt to the frame of the motor, the arrangement being such that by tightening of the single bolt the confronting ends of the sections are drawn tightly together. The bolt constitutes the sole means of attaching the two sections together and is made leak-proof by the presence of a sealing compound, as plastic cement, in the pocket formed by a countersunk opening in one of the sections.

In addition to the foregoing, it is a further object of the invention to provide such a motor with means that provide for a very neat joint between the two sections and at the same time provide a very effective seal between them. This is accomplished by having surfaces of the confronting ends of the housing sections arranged to form a groove that is concealed from the exterior of the housing but which accommodates a flexible gasket that is compressed in response to tightening of the single bolt that holds the housing assembled with the motor unit in it.

A still further object of the invention is to improve the manner in which lead wires for submersible electric motors are passed into the motor housing. At the junction of the support for the outboard motor there is one or more openings through which one or more electric wires are passed, these openings being in the socket that accommodates the outboard motor support, this same socket having a sealing compound generously applied in it to seal the openings through which the electric wires pass.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
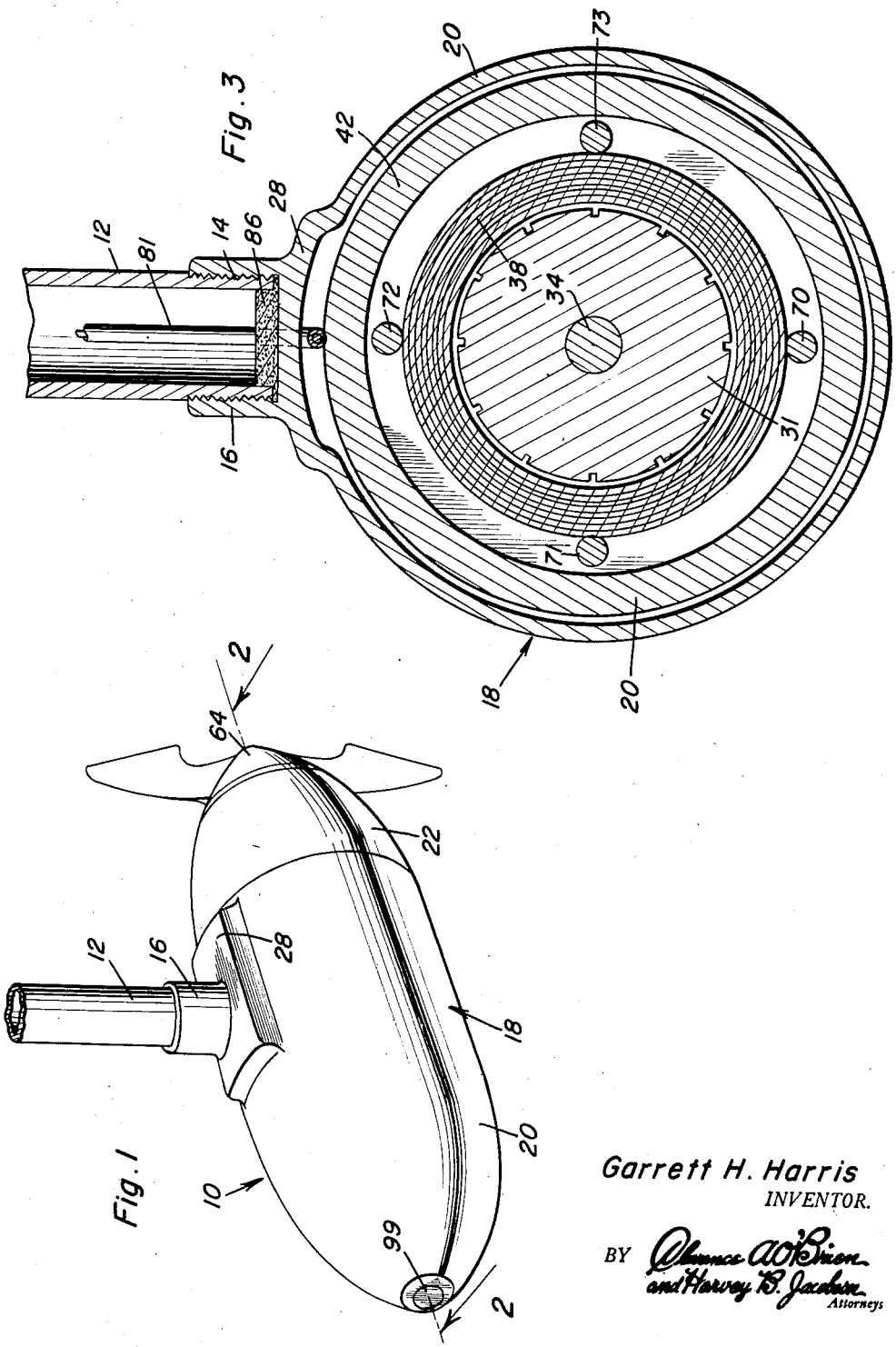
Figure 1 is a perspective view of an electric motor adapted to be used while immersed in water, the electric motor being made in accordance with the principles of the invention.

Electric motor 10 is adapted to be immersed in water and used. Inasmuch as the prime, although not exclusive, field of use for an electric motor of this type is in connection with boat propulsion, an outboard motor is illustrated. The support for the motor is usually a hollow column 12 whose lower end is threaded as at 14 in order to fit in and attach to a socket 16 that is threaded similarly but internally. Housing 18 for the motor is made of two hollow sections 20 and 22, the section 22 being shorter than the section 20 and hence, having a shallower cavity 24 from cavity 26 of section 20. Socket 16 is fixed to section 20 as by being cast integral with an upper raised part 28 thereof. Otherwise, the external configuration of the housing 18 is generally ellipsoidal.

An electric motor unit 30 is disposed in the housing 18. The electrical parts of the motor are purely conventional in their nature, construction and operation. Among the conventional parts are armature 31, commutator 32, armature shaft 34, two or more brush holders 36, and field coils 38. These parts are held assembled by a frame 40 which, for convenience in manufacture, is made in three parts 42, 44 and 46, respectively. Part 42 is an annular band interlocked as at 48 with part 44, the latter being also of annular construction, while part 46 is a spider that has an inwardly arranged socket 50 accommodating the inner end of armature shaft 34. A thrust bearing 52 is on the end of the armature shaft 34 that is located in bearing 50. Thrust bearing 54 on the opposite part of shaft 34 is located adjacent to the inner end of sleeve 58 whose bore 60 functions as a passage through which the shaft 34 passes. Standard packing 62 for the shaft 34 is used in the passage 60, while the outer end of shaft 34 is fitted with a standard propeller 64 pinned as at 66 or otherwise fastened thereto. In order to assemble the motor unit 30, one end thereof is disposed in the housing section 22 with shaft 34 passing through passage 60. Bolts 70, 71, 72 and 73 are passed through aligned openings as at 74 in the spider part 46 and intermediate part 44 of frame 40 and into tapped bores 76 concealed within section 22. Wires 80 and 81 are attached to binding posts 82 and 83, the latter being carried by a part of spider 46 and insulated, as by grommets therefrom. One wire is operatively connected to the field coils of the electric motor, while the other wire is operatively connected with the commutator 32 through the intermediate structure of the brushes in brush holders 36. The wires pass through openings 84 and 85 that are formed in the raised part 28 of motor housing section 20 and open into socket 16. A sealing compound 86 is generously applied in socket 16 in order to seal the openings 84 and 85, thereby preventing the entry of liquid into the motor housing at these points.

Figure 2:
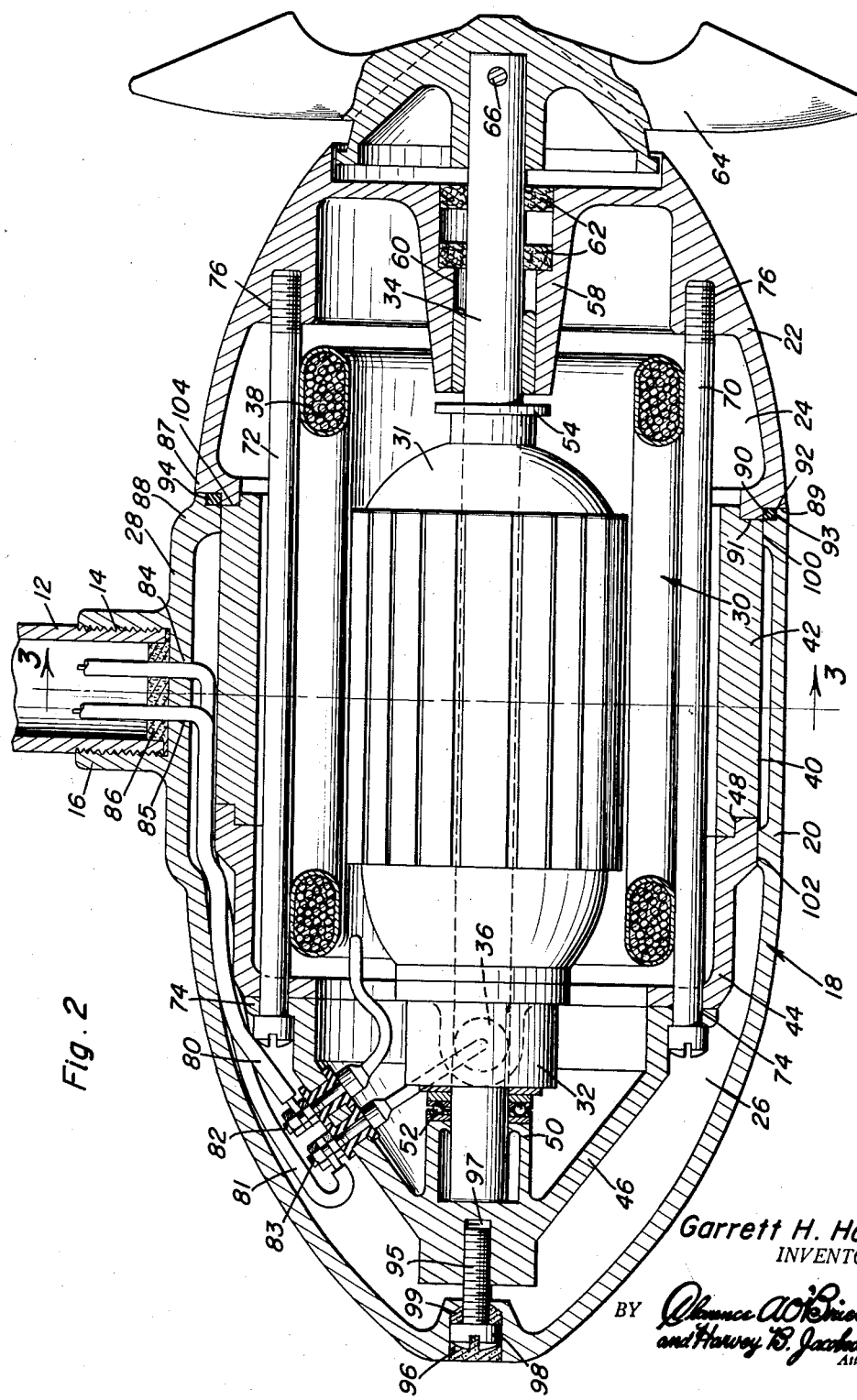
Figure 2 is a longitudinal sectional view of the outboard motor of Figure 1 and taken approximately on the line 2—2 of Figure 1; and, Figure 3 is a sectional view taken on the line 3—3 of Figure 2.

The confronting ends 87 and 88 of the housing sections 22 and 20 are specially constructed to form an effective seal between the sections. End 87 is provided with a flat surface 89 which is generally perpendicular to the longitudinal axis of the housing 18. This surface proceeds inwardly approaching that axis to an annular surface 90 which is parallel to the axis. Shoulder 91 is parallel to surface 89 in order to form a step in section 22. End 88 of section 20 has a surface 92 which is narrower than surface 89, but which is parallel thereto. Surfaces 89 and 92 are adapted to be brought flush against each other so that from the exterior of housing 18 the appearance at the junction of the two sections is of an extremely thin line. Surface 92 recedes upon movement inwardly toward the axis of the housing in order to form with the other surfaces 89 and 90, a groove 93 that is concealed from the exterior of the housing when the two sections thereof are brought together (Figure 2). Flexible gasket 94 which may be made of rubber or other pliable material, is disposed in the groove 93 and is adapted to be compressed when the two sections 22 and 20 of the housing are drawn together.

Assembling the section 20 onto the section 22 of housing 18 is accomplished by placing the part of the motor unit 30 that protrudes from section 22 into the cavity 26 of housing section 20. Then a single bolt 95 is passed through the countersunk opening 96 at the end of section 20. It is threaded into the tapped bore 97 in spider part 46 of motor unit frame 40. Bolt 95 has a head 98 that fits into the pocket formed by the countersunk opening 96 neatly, but without binding. In order to form a liquid seal for the single bolt 95, a sealing compound, as plastic cement 99, is placed in the pocket formed by countersunk opening 96 prior to and after the bolt 95 is threaded in bore 97. As bolt 95 is tightened, the reaction is through the motor unit 30 which pulls the end 87 of housing section 22 against the confronting end 88 of housing section 20. The last-mentioned section is drawn tightly against section 22 by the head of the bolt reacting thereon.

In order to disassemble the motor the only thing required is the removal of bolt 95. Upon such removal the section 22 is capable of being slipped from section 20 with the motor unit frame 40 sliding outwardly. In both removing and assembling the motor unit from section 20, the guide and supporting surfaces 100 and 102 in section 20 assure proper alignment of the motor unit and the sections. The extremity of part 42 of frame 40 has a shoulder 104 which is adapted to come into contact with shoulder 91 of end 87 on section 22. This further assures proper alignment of the motor unit in the assembly.

Should it be desirable or necessary to remove the motor unit from section 22, the bolts 70, 71, 72 and 73 are removed permitting the motor to be disassembled. Any motor repairs may be made with the motor so assembled without the necessity of removing the propeller 64 therefrom. Should this be desired, though, it is a simple matter to remove the propeller, the latter being held in place by standard means.

From the foregoing the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. In an electric outboard motor for a boat, a housing having a longitudinal axis and consisting of a first and a second hollow housing section, said sections having confronting open ends, one end having a flat surface generally perpendicular to said axis, the other end having a similarly disposed surface of smaller width than the first-mentioned surface to form therewith a groove inwardly of said surfaces, a flexible gasket in said groove to seal the junction of said sections with the external edges of said surfaces flush, a motor unit having a shaft and a frame, said first section having a passage through which said shaft passes, a shoulder on said first section against which said frame abuts, means securing said unit in said first section and bringing said frame tightly against said shoulder, means accessible from the exterior of said housing and connected to said frame for pulling said unit in such direction that said first section has its end drawn toward said end of said second section, the last-mentioned means comprising a bolt having a head, a countersunk opening in said second section accommodating said head, a sealing compound in said countersunk opening, a socket on said second section and having an axis at an angle to said housing axis in which to accommodate a support for the motor housing, electric wires for the motor in said socket, said housing having a hole which opens into said socket and through which said wires are passed, and a sealing compound in said socket.

2. The electric outboard motor of claim 1 wherein said frame has an end wall located adjacent to the end of said second section, binding posts in said end wall, insulating grommets separating said binding posts from said end wall of said frame, said electric wire attached to said binding posts, and further electric wires extending from the opposite ends of said binding posts and connecting respectively to the armature and field of the motor unit.

References Cited in the file of this patent

UNITED STATES PATENTS 2,080,678    Van Horn et al. _____ May 18, 1937